Dec. 16, 1941.  H. A. ROAN  2,266,077
INTERNAL COMBUSTION ENGINE
Filed Oct. 3, 1938  10 Sheets-Sheet 2
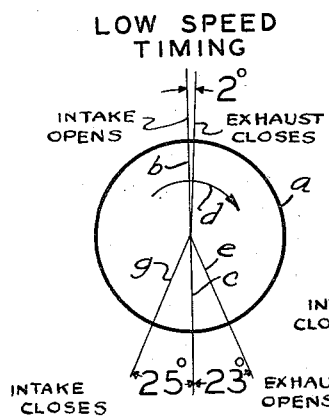
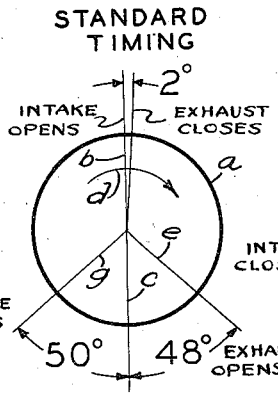
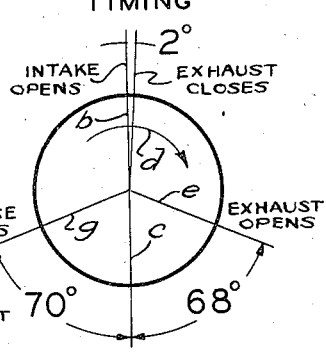
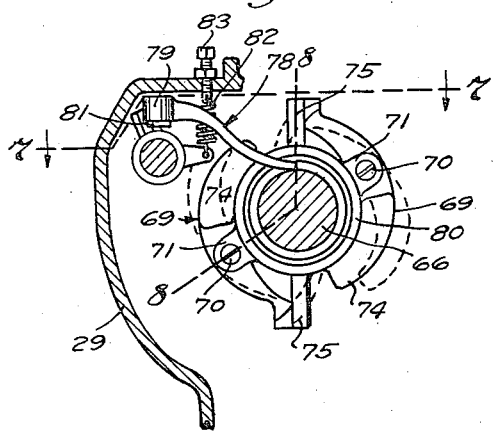
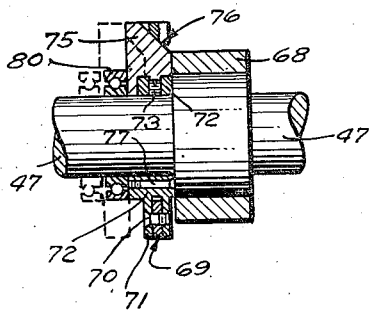
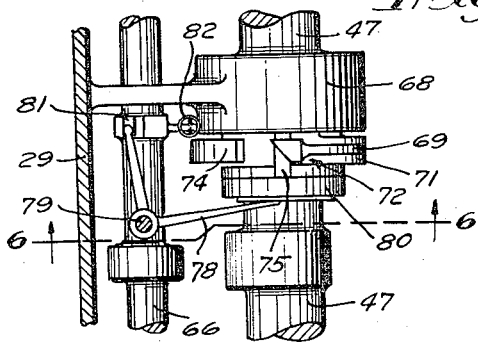

Dec. 16, 1941.     H. A. ROAN     2,266,077
INTERNAL COMBUSTION ENGINE
Filed Oct. 3, 1938     10 Sheets-Sheet 3
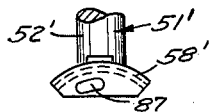
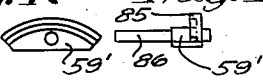
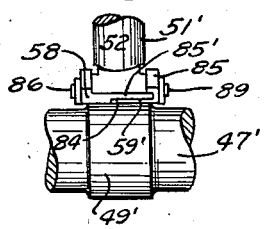
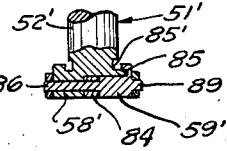
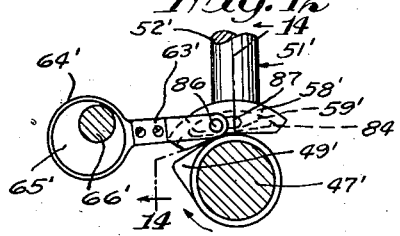
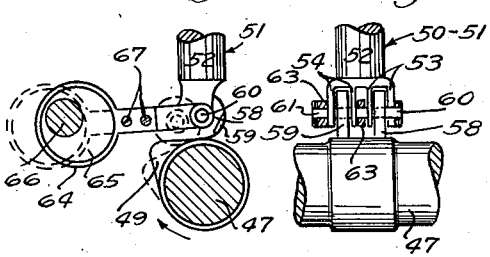
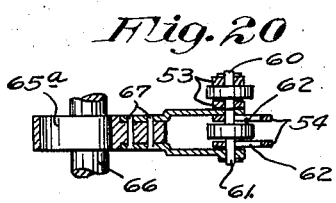
Inventor
Henry A. Roan
By his Attorneys
Merchant & Merchant Dec. 16, 1941.  H. A. ROAN  2,266,077
INTERNAL COMBUSTION ENGINE
Filed Oct. 3, 1938  10 Sheets-Sheet 4

Inventor
Henry A. Roan
By his Attorneys
Merchant & Merchant

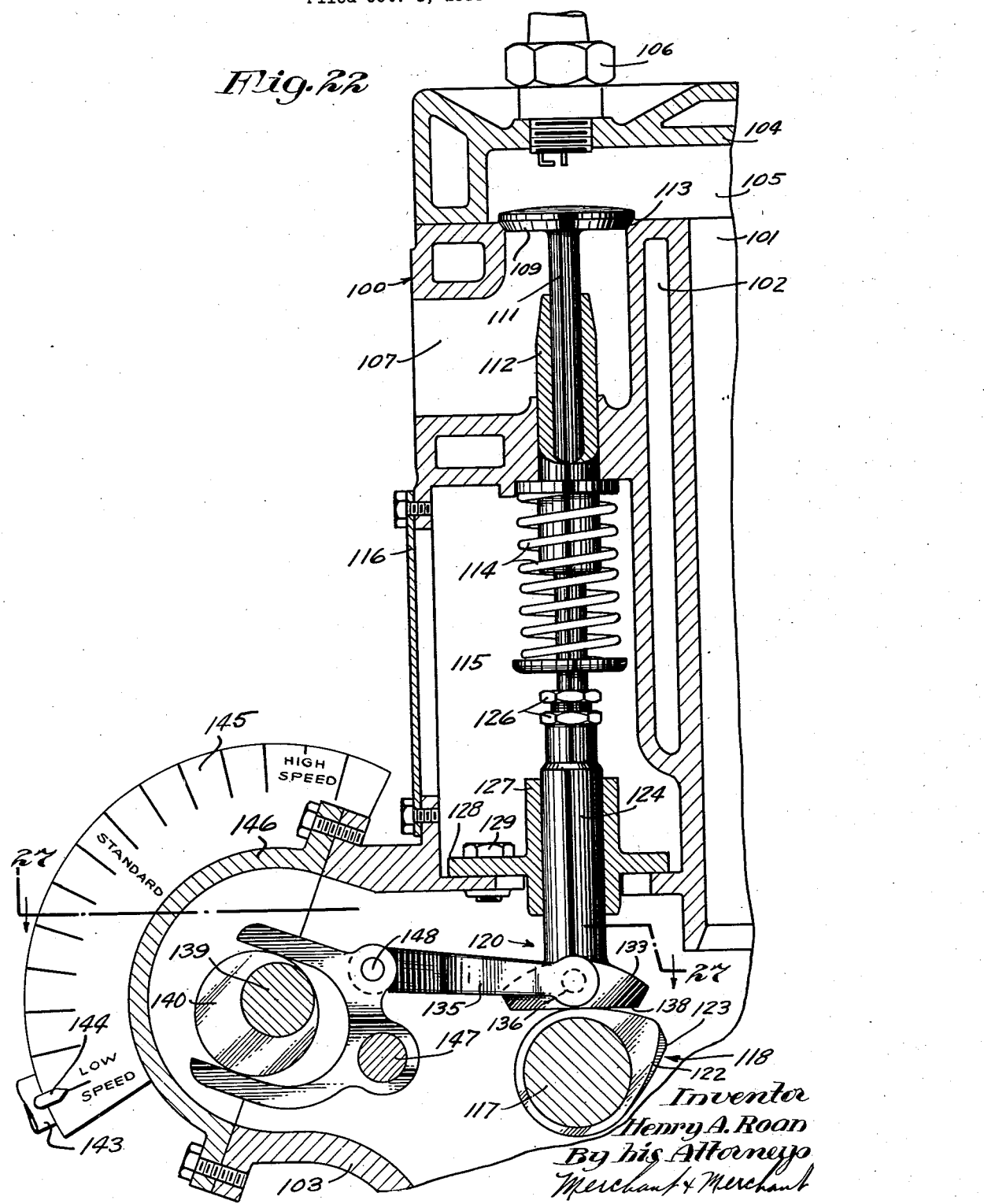

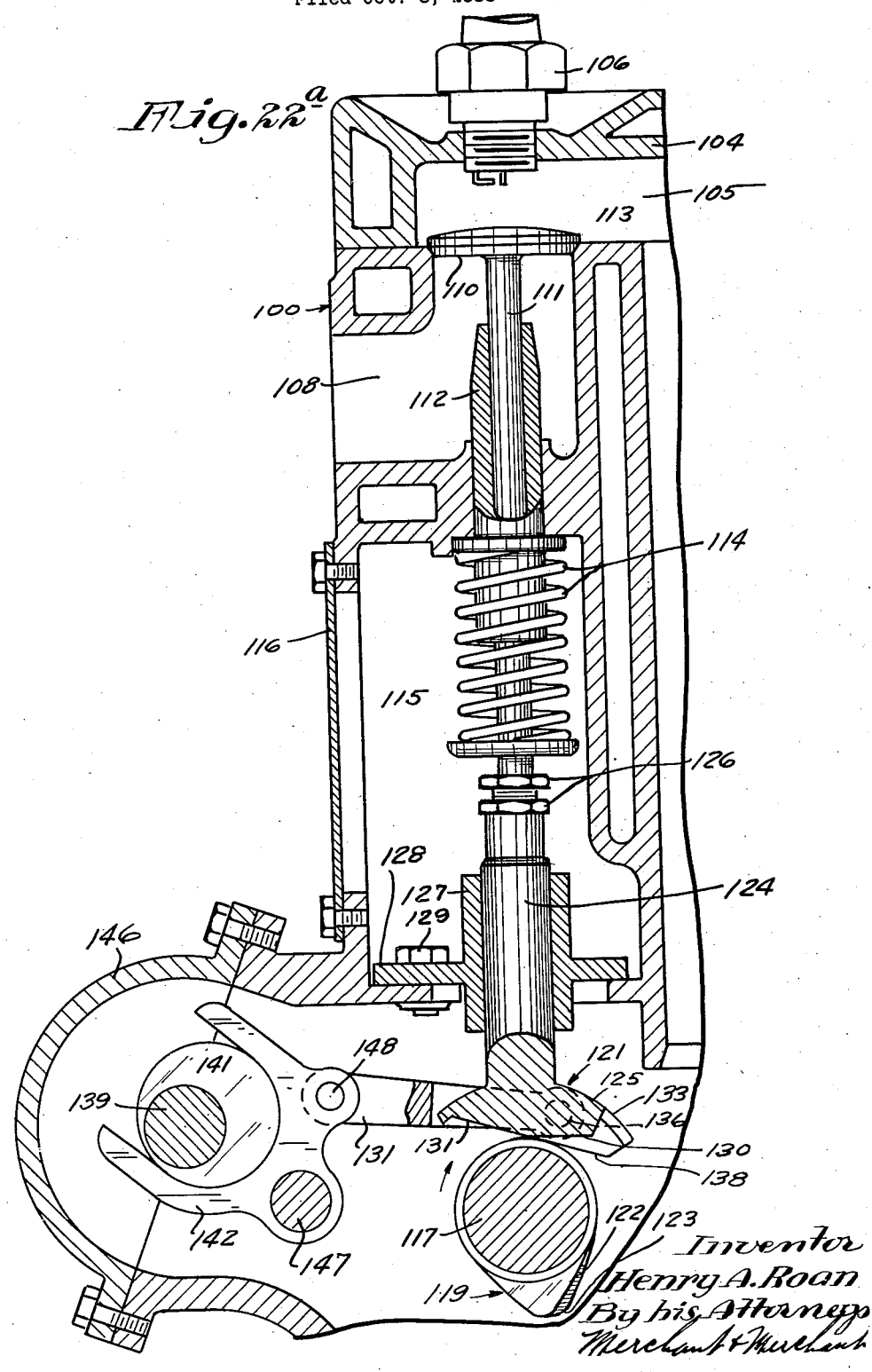

Dec. 16, 1941.   H. A. ROAN   2,266,077
INTERNAL COMBUSTION ENGINE
Filed Oct. 3, 1938   10 Sheets-Sheet 7
Fig. 23    INTAKE LOW SPEED
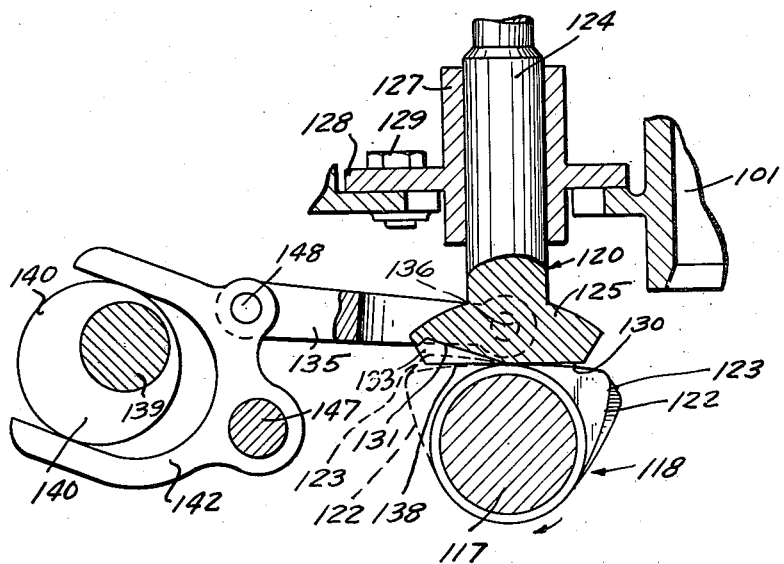
Fig. 24    INTAKE HIGH SPEED
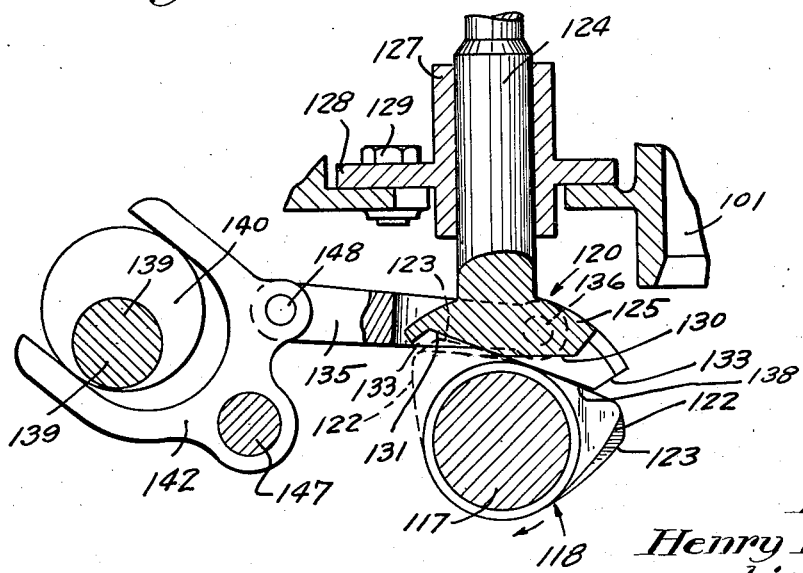
Inventor
Henry A. Roan
By his Attorneys
Merchant & Merchant Dec. 16, 1941.  H. A. ROAN  2,266,077
INTERNAL COMBUSTION ENGINE
Filed Oct. 3, 1938   10 Sheets-Sheet 8

EXHAUST LOW SPEED

EXHAUST HIGH SPEED

Inventor
Henry A. Roan
By his Attorneys
Merchant & Merchant

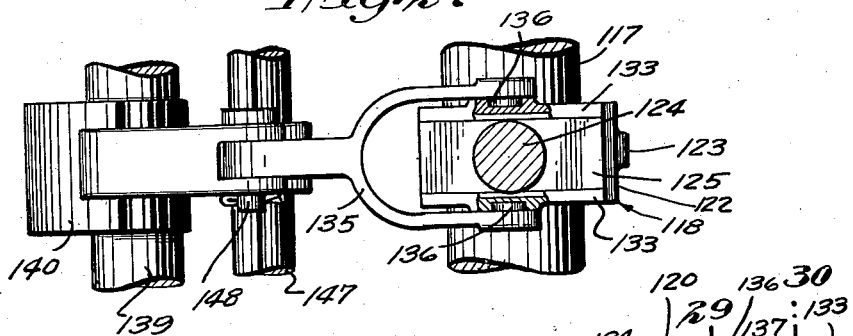
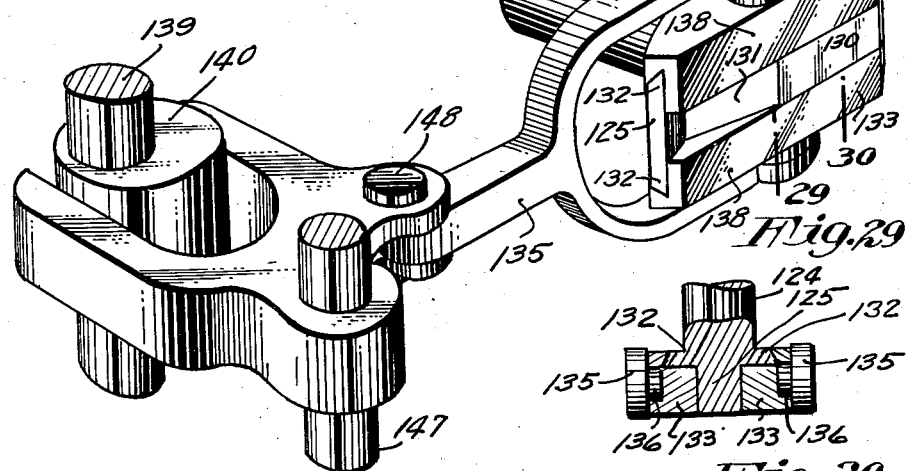
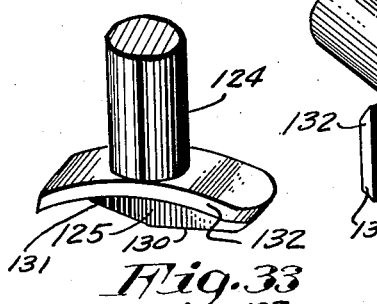
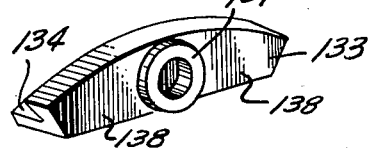

Dec. 16, 1941.  H. A. ROAN  2,266,077
INTERNAL COMBUSTION ENGINE
Filed Oct. 3, 1938  10 Sheets-Sheet 10

LOW SPEED

STANDARD

HIGH SPEED

Inventor
Henry A. Roan
By his Attorneys
Merchant & Merchant

Patented Dec. 16, 1941

2,266,077

UNITED STATES PATENT OFFICE 2,266,077

INTERNAL COMBUSTION ENGINE

Henry A. Roan, Minneapolis, Minn.

Application October 3, 1938, Serial No. 233,103

22 Claims. (Cl. 123—90)

This invention relates to mechanism for varying the timed action of valves of internal combustion engines, and has as an important object to increase the efficiency of internal combustion engines, particularly engines of the type wherein valves are operated by cams, and to this end, I provide a highly efficient and relatively simple mechanism whereby the timed action of the valves may be so regulated that the engine will operate at maximum efficiency through its entire range of speeds.

The above and other important objects and advantages of the invention will be made apparent from the specification and claims.

In the accompanying drawings, which illustrate the invention, like characters indicate like parts throughout the several views.

Referring to the drawings:

Figs. 3, 4 and 5 are valve-timing diagrams illustrating various different valve timings obtainable in engines incorporating the invention;

Fig. 6 is a fragmentary transverse sectional view taken on the line 6—6 of Fig. 7;

Fig. 7 is a fragmentary horizontal sectional view taken on the line 7—7 of Fig. 6;

Fig. 8 is a detail sectional view taken on the line 8—8 of Fig. 6;

Fig. 9 is an enlarged fragmentary detail view of certain important parts of the preferred form of variable timing exhaust valve operating mechanism incorporated in Fig. 1;

Fig. 10 is a view similar to Fig. 9 but illustrating corresponding parts of the preferred form of variable timing intake valve operating mechanism incorporated in Fig. 2;

Fig. 11 is a fragmentary view looking from right toward left in respect to Fig. 9 or from left to right in respect to Fig. 10, some parts being broken away or omitted and some parts being shown in section;

Fig. 12 is a view similar to Fig. 9 but illustrating a somewhat modified form of exhaust valve operating mechanism;

Fig. 13 is a fragmentary view looking from right toward the left in respect to Fig. 12;

Fig. 14 is a fragmentary sectional view taken on the line 14—14 of Fig. 12;

Figs. 15, 16 and 17 are views in side elevation of each of the several parts of the multiple section tappet structure shown in Figs. 12, 13 and 14.

Fig. 18 is a view looking from right to left in respect to Fig. 16;

Fig. 19 is a view looking from right to left in respect to Fig. 17;

Fig. 20 is a horizontal sectional view taken on the line 26—26 of Fig. 10;

Fig. 22 is a substantially full scale fragmentary sectional view of an internal combustion engine incorporating still another form of the invention, the section in this instance being taken through the axis of the engine's intake valve;

Fig. 23 is a detail view corresponding to Fig. 22 but with some parts omitted and some additional parts broken away and shown in section;

Fig. 24 is a view showing a different position of the parts shown in Fig. 23;

Fig. 27 is a detail sectional view with some parts omitted and some parts broken away and shown in section taken on the line 27—27 of Fig. 22;

Fig. 28 is a detail perspective view with some parts broken away and some parts in section of the parts of the tappet mechanism of Fig. 27;

Fig. 29 is a detail sectional view taken on the line 29—29 of Fig. 28;

Fig. 30 is a detail sectional view taken on the line 30—30 of Fig. 28;

Figs. 31 and 32 are perspective views of the non-shiftable tappet element of Figs. 22 to 30 inclusive;

Fig. 33 is a perspective view of one of the shiftable tappet elements of Figs. 22 to 30 inclusive.

Fig. 34 is a detailed perspective view of one of the cams employed in connection with the form of the invention disclosed in Figs. 22 to 33, inclusive.

Fig. 22a is a sectional view substantially corresponding to Fig. 22, but being sectional through the axis of the exhaust valve of the cam cylinder of the engine as in Fig. 22.

Figure 1:
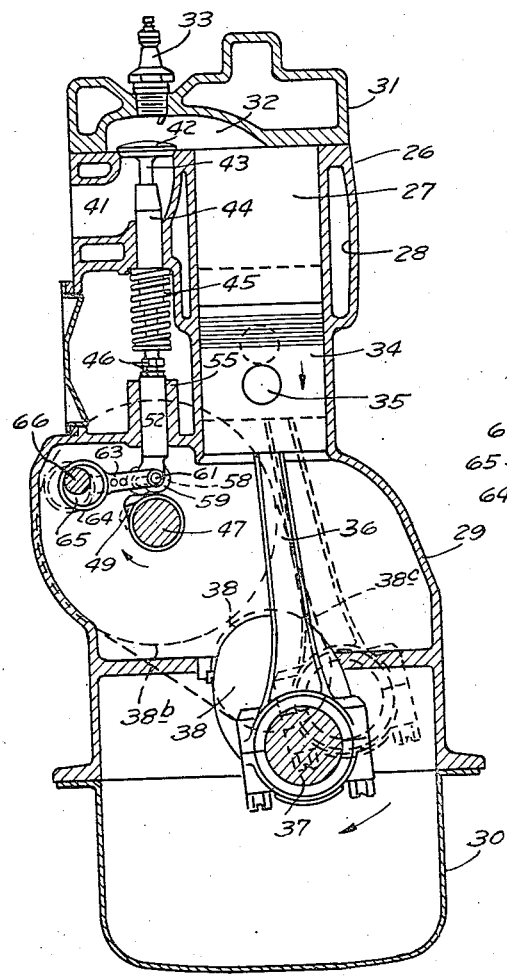
Fig. 1 is a transverse vertical section through a cylinder and the axis of the co-operating exhaust port and valve of an engine incorporating a preferred embodiment of the invention.
Figure 2:
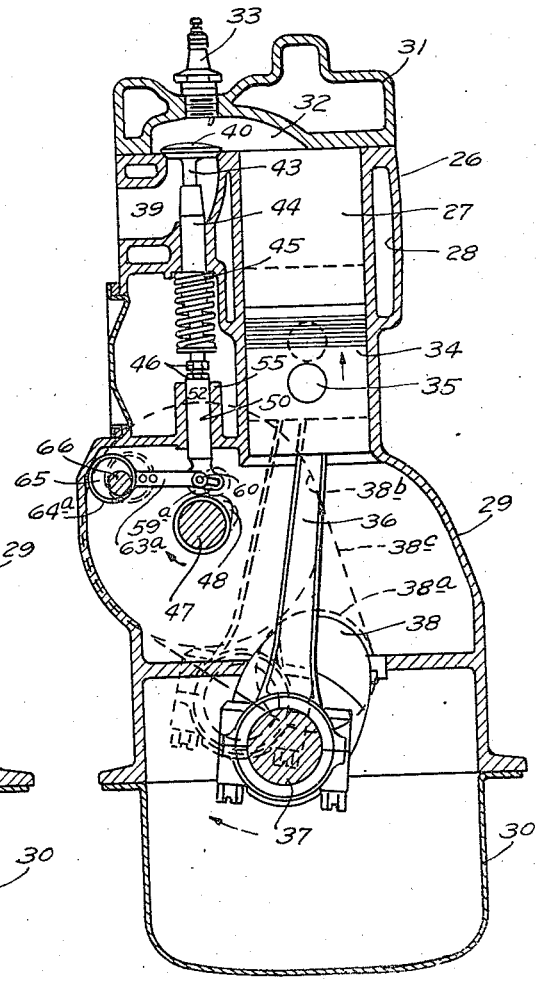
Fig. 2 is a transverse vertical sectional view similar to Fig. 1, and taken through the same cylinder as Fig. 1, but differs from Fig. 1 mainly in that it is taken through the axis of the intake port and valve of the cylinder instead of the exhaust port and valve as in Fig. 1.

With reference first to the conventional parts of the engine, shown in Figs. 1 and 2, the engine block, indicated as an entirety by the numeral 26, is formed with the desired number of cylinders 27 and about the cylinder or cylinders with water jackets 28. The engine block 26 is also formed to afford the upper portion of a crank case 29 that is normally closed and completed by means of a removable base 30. Since only one cylinder of the engine and its co-operating parts are herein illustrated, only one cylinder and its co-operating parts will hereinafter be referred to, although it should be understood that the invention, by mere duplication of certain parts, adapts itself to engines having any number of cylinders.

The cylinder 27 is normally closed in the conventional manner by a water-jacketed cylinder head 31 that is formed to afford a combustion chamber 32 and is provided with the usual spark plug 33. Working in the cylinder 27 is a piston 34 that is connected by means of a wrist pin 35 and connecting rod 36 to the throw or crank 37 of a crank-shaft 38.

Formed in the engine block 26 for communication with the cylinder 27 are intake and exhaust ports 39 and 41, respectively. These ports 39 and 41 are respectively controlled by conventional type poppet valves 40 and 42. The axial stems 43 of these valves 40 and 42 work and are guided for true vertical reciprocating movements in guides 44. In accordance with usual practice the valves 40 and 42 are maintained under yielding closing pressure by means of coiled compression springs 45 applied around their stems 43, which stems, at their lower end, are provided with the customary adjustable tappet-engaging nuts 46.

Mounted in suitable bearings in and extending longitudinally of the crank case 29 is a cam shaft 47 that is provided with a cam 48 for the intake valve 40 and a cam 49 for the exhaust valve 42. The cam shaft 47 is, as usual, driven from and in a predetermined timed relation to the piston through connections including the piston driven crank-shaft 38, a timing gear 38a on one end of the crank-shaft, timing gear 38b on the same end of the cam shaft, and a chain 38c running over said gears.

It is, of course, necessary in order that the valves 40 and 42 will be operated from their co-operating cams 48 and 49, respectively, to provide suitable operating connection between the cams and the stems of their respective co-operating valves and in accordance with the several examples of the invention herein illustrated, as well as in general practice, such operating connections between the cams and valve stems are afforded by means of floating members known in the art as tappets. The tappets herein illustrated, however, are novel in character, having cam-engaging surfaces that are so adjustable in respect to the cams as to effect desired variations in the action of the valves. The term "tappet" is herein used in a broad sense and is intended to include any member operated directly by a cam and serving as an operating link between the cam and valve whether it constitutes the sole link or one of several connecting links.

With reference now to the embodiment of the invention illustrated in Figs. 1, 2, 9, 10 and 11, the intake valve operating tappet, see Figs. 2, 10 and 11, is indicated as an entirety by 50 and the exhaust valve operating tappet, see Figs. 1, 9 and 11, is indicated as an entirety by 51. In the particular engine illustrated, which is of the so-called L-head type, the tappets 50 and 51 serve as the only connecting links between their respective co-operating cams and valve stems, this being conventional practice in L-head engines.

The tappets 50 and 51 are alike but in use are turned 180°, one in respect to the other. Each of these tappets comprises a stem-like valve-engaging main body 52, formed at its lower end with laterally spaced pairs of laterally spaced flanges 53 and 54, a non-shiftable cam-engaging roller 58 journaled between the pair of flanges 53 and a like but shiftable cam-engaging roller 59 journaled between the pair of flanges 54. The roller 58 of each tappet is journaled on a pin 60 that is rigidly mounted at its opposite ends in the flanges 53 and the roller 59, of each tappet, is journaled on a pin 61 that is shiftably mounted in and extends through segmental slots 62 in opposite sides of the flanges 54. The curvature of the segmental slots 62 conforms to that of a circle struck from the axis of the cam shaft 47 and the journal pins are shiftable therein from extreme positions wherein they and their rollers 59 are co-axially aligned with the non-shiftable rollers 58 and their pivot pins 60 to opposite extreme positions considerably removed from the first noted extreme positions, in the direction of rotation of the cam shaft in the case of the intake valve-operating tappet 50, and in a direction opposite to the direction of rotation of the cam shaft in the case of the exhaust valve operating tappet 51. The stem-like bodies 52 of the tappets 50 and 51 engage the stems 43 of their respective co-operating valves 40 and 42 and work freely in guide bearings 55 in the engine block. The rollers 58 and 59, of course, ride alternately on the cam shaft 47 and their co-operating cam 48 or 49, the valves being opened under engaging movements of their co-operating cams with their co-operating tappet rollers and being closed by valve springs 45 under disengaging movements of the cams from the tappet rollers.

It will, of course, be evident that when the tappet rollers 59 are aligned with their respective co-operating rollers 58, the tappets will function exactly as do conventional types of roller tappets since the cams will engage and disengage both their respective co-operating rollers simultaneously; and it will further be evident that when the rollers 59 are shifted the duration of the open periods of the valves will be increased, with respect to the travel of the piston and cam shaft since the cams will successively engage the tappet rollers 58 and 59. A first engaged tappet roller 58 or 59 will ride the leading edges of its respective co-operating cam 48 or 49 and serve to lift and open its valve and the last engaged tappet roller 58 or 59 will ride the trailing edges of its co-operating cam and serve to control closing movements of its valve. In short, it may be stated that the angular operative movements of the cams may be varied by shiftably adjusting the rollers 59.

It is customary in engines employing roller tappets to provide co-operating cams with relatively blunt or broad noses as compared to cams used in connection with flat faced tappets, so as to slow down the reversing action of the valves. This same practice is preferably followed in connection with the roller tappet embodiment of the invention illustrated in Figs. 1, 2, 9, 10 and 11, for the reason given above when the rollers 58 and 59 are aligned, and for the further reason that when the co-operating rollers 58 and 59 are shifted, one in respect to the other, the nose of the co-operating cam 48 or 49 will move from a position of dead center on one of said rollers to a position of dead center on the other thereof without producing or permitting appreciable movement of the tappet or its co-operating valve. Since in the tappet structure described there are two cam-engaging elements, to wit: the rollers 58 and 59, the tappets may be properly termed "multiple section tappets" to distinguish the same from conventional tappets having one cam-engaging element or surface.

As a simple and effective means for simultaneously shifting the rollers 59 of tappets 50 and 51 in opposite directions, I provide operating mechanism including an operating shaft 66 having formed or rigidly secured thereon eccentrics 65 and 65a which eccentrics, it will be noted, while alike, are rotatively positioned 180° apart on the shaft 66. The eccentric 65 is connected to operate the roller 59 of the exhaust valve tappet 51 by means of an eccentric strap 64 and a rigidly attached yoke 63 opposite free end portions of which yoke receive opposite projected ends of journal pins 60. The eccentric 65a is similarly connected to shiftable roller 59 of tappet 50 by means of a like eccentric strap 64a and yoke 63a. The opposite arms of yokes 63 and 63a are securely but removably applied to the straps 64 and 64a, respectively, by screw-threaded bolts or the like 67. The shaft 66 extends in parallel relation to the cam shaft 47 and is suitably journaled at its ends in the end portions of the crank case.

The shaft 66 may, of course, be operated in a number of ways, either manually or automatically, but is preferably automatically operated according to engine speed in such a manner that the timing of the intake and exhaust valves 40 and 42, respectively, will be so varied, according to the speed of the engine, that the engine will, at all times, regardless of speed be operated at a point of maximum efficiency. This automatic regulation of the valve timing is most conveniently accomplished by means of a centrifugal governor such, for example, as the governor illustrated in Figs. 6 to 8, inclusive.

Before describing the governor, attention is called to the fact that the cam shaft 47, besides being journaled at its opposite ends in the crank case as previously stated, is also intermediately journaled in a bearing or bearings 68 which are supported from the crank case. The governor, in the form herein illustrated, includes a pair of centrifugally actuated arms 69 that are each intermediately pivoted at 70 in the bifurcated end 71 of a fixed collar 72 that is securely mounted on the cam shaft adjacent the bearing 68, by means of a set-screw or the like 73. One end of each of the intermediately pivoted arms 69 is enlarged to provide a weighted portion 74.

Axially slidably mounted on the cam shaft 47 is a shifter collar 75 having diametrically opposed cam surfaces 76, each of which is normally engaged by the light free end of a different centrifugally actuated arm or lever 69. The shifter collar 75, while axially shiftable in respect to the fixed collar 72, is caused to rotate in common therewith by means of a sliding pin engagement at 77. It will now be obvious that under centrifugal action the weighted ends 74 of the intermediately pivoted levers 69 will move outwardly and the inner ends thereof will press against the cam surfaces 76 of the shifter collar and cause the shifter collar to move toward the left to an extreme position shown by dotted lines in Fig. 8.

To transmit the movement of this collar 75 to the shaft 66, there is provided a bell-crank 78 that is pivoted to the crank case at 79. The free end of one arm of this bell-crank 78 is moved by the shifter collar 75 through the medium of an anti-friction bearing 80 with which it has constant engagement and the free end of the other arm of the bell-crank 78 works in the bifurcated end of a lug 81 which projects from the shaft 66. The parts 75, 78, 81 and 66 and other parts controlled thereby, are at all times retained under tension to move to their normal positions, shown in full lines, by a coiled tension spring or the like 82, the tension of which may be adjustably varied by means of a suitable tension-adjusting bolt or the like 83. The coil spring 82 maintains its co-operating parts in their full line positions when the engine is idle or running at very low speeds, but as the speed of the engine is progressively increased the weighted ends 74 of levers 69 are moved progressively outward under increased centrifugal action, the yielding action of the spring 82 will be increasingly overcome and the shaft 66 will be moved in a clockwise direction.

This clockwise rotation of the shaft 66, under increased engine speed, produces shifting of the tappet rollers 59 in opposite directions from their normal positions of alignment with their respective co-operating rollers 58; this shifting, due to the settings of the eccentrics 65 and 65a, being in the direction of rotation of the cam shaft 47 in the case of the intake valve tappet 50 and being in a counter-cam shaft rotation direction in the case of the exhaust valve operating tappet 51.

Certain of the valve timings obtainable with the preferred arrangement described are indicated diagrammatically in Figs. 3, 4 and 5. In these figures the circles marked *a* indicate one complete rotation or 360° of movement of the crank 37, and hence, one complete reciprocation or two strokes of the piston 34; the vertical lines marked *b* indicate top dead center position of the crank 37; vertical lines marked *c* indicate bottom dead center position of the crank 37; and the arrows *d* indicate the direction of rotation of the crank 37.

*Operation of Figs. 1 to 11, inc.*

During the starting period and when the engine is running at very low speed, the shaft 66 will be maintained, by the governor spring 82, in its extreme counter-clockwise position and the shiftable rollers 59 will be in positions of alignment with their respective co-operating rollers 58, all as shown by full lines in the drawings.

With the rollers 59 thus positioned the timed action of the valves 40 and 42 and the resultant intake and exhaust periods, with respect to the position and travel of the piston 34 and crank 37, will be substantially as follows:

The cam 49 will come into simultaneous engagement with the rollers 58 and 59 of tappet 51 and begin to lift said tappet and open the exhaust valve 42 when the piston-operated crank 37 comes to a position 23° before bottom dead center of the downward working stroke of the piston, as shown by full lines in Fig. 1 and Fig. 9 and indicated diagrammatically by a line e in Fig. 3. The exhaust valve will now be held open more or less during the balance of the downward working stroke of the piston and during the entire upward exhaust stroke of the piston and will finally be closed and terminate the exhaust period when the piston crank is 2° past top center, as indicated diagrammatically by line f in Fig. 3. When the piston crank 37 is in a position 2° in advance to its position at the time of complete closing of the exhaust valve 42 or at top dead center at the termination of the exhaust stroke of the piston, the cam 48 comes into simultaneous engagement with rollers 58 and 59 of tappet 50 and begins to raise and open said tappet and the intake valve 40 to start the intake period, such point of opening of the intake valve for low speed operation being indicated diagrammatically by line b in Fig. 3. The intake valve will now be held open more or less during the entire downward intake stroke of the piston and during the initial upward compression stroke, complete closing of the intake valve being effected when the piston crank 37 is 25° past bottom center on its upward compression stroke, as illustrated by full lines in Fig. 2 and indicated diagrammatically by line g in Fig. 3. Otherwise stated, the exhaust valve will, under low speed operation, be open more or less during 205° of movement of the crank 37 and the intake valve 40 will be open during 205° of movement of the crank 37.

It is important here to bear in mind that the above described low speed timing is obtainable with the co-operating rollers 58 and 59 of tappets 50 and 51 in co-axial alignment, in which positions the tappets 50 and 51 act as conventional roller type tappets, since both co-operating rollers of each tappet are simultaneously engaged and disengaged by their co-operating cams 48 or 49.

As the speed of the engine is progressively increased the rollers 59 of tappets 50 and 51 will be progressively shifted from positions of axial alignment with their respective co-operating rollers 58, the former in the direction of rotation of the cam-shaft and the latter in a counter camshaft rotation direction, until at very high speed the rollers 59 will be shifted to their extreme high speed positions, shown by dotted lines in Figs. 1, 2, 9 and 10. With the tappet rollers 59 in this position for high speed operation, the timing of the intake and exhaust periods will be substantially as diagrammatically indicated in Fig. 5, wherein the line e indicates the time of opening of the exhaust valve and the beginning of the exhaust period as being when the piston crank 37 is 68° before bottom center; the line f indicates the closing of the exhaust valve as being when the piston crank is 2° past top center; and g indicates the closing of the intake valve 40 as occurring when the piston crank is 70° past bottom center. Opening of the intake valve at high speed is indicated in Fig. 5 as being effected at top center.

By now comparing Figs. 3 and 5, it will be seen that for high speed operation the opening of the exhaust valve has been advanced 45° in respect to the travel of the piston crank 37 and the closing of the intake valve 40 has been retarded 45° in respect to the travel of the piston crank without, however, affecting the time of closing of the exhaust valve or the time of opening of the intake valve. In other words, for high speed operation the duration of the open periods of the exhaust and intake valves has been increased, in respect to the travel of the piston crank, by 45° of movement of said crank irrespective of and without affecting the time of closing of the exhaust valve or the time of opening of the intake valve.

Fig. 4 diagrammatically represents an obtainable intermediate speed timing and in this figure, line e indicates the opening of the exhaust valve 48° before crank bottom center; f indicates the closing of the exhaust valve 2° past crank top center; b indicates the opening of the intake valve at crank top center; and g indicates closing of the intake valve 50° past crank bottom center.

The valve timing diagrams of Figs. 3, 4 and 5 are merely indicative of possible timings obtainable by means of the invention and since the merits of variable valve timing appear to be generally recognized, no detail description of the advantages thereof is thought necessary. However, it may be stated that whereas relatively long compression and power strokes are desirable for starting and for low speed operation and will result in materially higher efficiency and smoother performance at low speeds, relatively long intake and exhaust periods become of increasing importance under increased engine speed.

These requirements are obviously fully met with the mechanism described and engines employing the same may be made to operate at or near maximum efficiency throughout their full speed range, whereas, engines employing fixed timing must essentially be highly efficient over a relatively narrow range of speeds. It will of course be appreciated that substantially any engine designed to employ roller tappets may readily be arranged to accommodate the multiple section roller tappet mechanism described by merely enlarging the crank case sufficiently to accommodate the eccentric shaft 66. However, in some engines, designed primarily for use of mushroom type tappets, there may not be sufficient clearance between the cam and tappet guide bearings to accommodate my roller tappet arrangement, and, therefore, for use in such engines and for use by designers who prefer to use mushroom type tappets, I provide the multiple section tappet arrangement illustrated in Figs. 12 to 19 inclusive.

*Description of Figs. 12 to 19*

In this form of the invention, as in the first form described, the exhaust valve and intake valve operating tappets are structurally alike and are merely applied in positions rotated 180°, one in respect to the other, so that the shiftable elements thereof will be shiftable in opposite directions. In view of this fact only the exhaust valve operating tappet is illustrated, being indicated as an entirety by 51'. This latter form of tappet may be employed in substitute for the roller type tappets incorporated in Figs. 1 and 2 provided, however, that, if the same variable timing is desired as is obtained with the roller tappets described, the cam shaft 47 with its blunt roller type cam can be replaced by a cam shaft having relatively sharp nosed cams of the character more generally used in connection with mushroom tappets. Such a cam shaft is indicated in Figs. 12 and 13 by 47' and the relatively sharp nosed exhaust valve operating cam thereof is indicated by 49'.

The multiple section mushroom type tappet 51 comprises a vertically disposed stem 52' formed rigidly with the horizontally disposed fixed or non-shiftable cam-engaging section 58', an adjustably supported shiftable cam-engaging section 59', and an intermediate floating cam-engaging section 84. The upper surface of the shiftable section 59' is arcuate in the plane of movement of cam 49', works against a similarly formed surface on the under side of the stem 52', and is provided, at its outer edge, with an inturned flange 85 affording an arcuate channel to receive and work slidably over an arcuate flange 85' on the stem 52'. For retaining the parts together the shiftable section 59' is provided with a laterally projecting pin 86 that works through a segmental or arcuate slot 87 in the fixed tappet section 58'. The segmental slot 87 and the several arcuate surfaces above noted are struck from the axis of the cam shaft. The floating section 84 is interposed between sections 58' and 59' and over the pin 86 which latter, said section 84, is slotted at 88 to receive pin 86. The slot 88 is shorter than slot 87 so that the floating member 84 will partake of only approximately one-half the movement of section 59'. Shiftable section 59' is provided in axial alignment with its pin 86 with a short pin 89.

The operating mechanism employed in connection with this last noted form of tappet is equivalent to that used in connection with the roller type tappet, the eccentric shaft being indicated by 66', the exhaust valve tappet operating eccentric thereof by 65', the eccentric by 64', and the yoke by 63'.

The opposite ends of the yoke 63' are provided with suitable apertures to receive the ends of pins 86 and 89 and when applied the yoke 63' serves to hold the tappet parts against axial separation. The eccentric shaft 66' may be assumed to be provided with a suitable governor such as shown in connection with shaft 66 whereby under starting conditions and low speed operation the shaft 66' will be moved to an extreme counter-clockwise position and under progressively increased engine speed will be progressively rotated in a clockwise direction. Under these conditions the variable timing obtainable will be exactly the same as that provided by means of the roller tappet arrangement and diagrammatically indicated in Figs. 3, 4 and 5. Under low speed operation the cam-engaging surfaces of sections 58', 59' and 84 of tappet 51', will be aligned and engaged and disengaged simultaneously by the cam and the action of the tappet will be exactly like that of conventional mushroom type tappet and also like that of roller tappet 51 when both of its rollers 58 and 59 are aligned. The low speed timing obtained with the parts thus aligned is as indicated in Fig. 3. Under high engine speeds the sections 59 and 84 of tappet 51 will be shifted in a counter cam shaft rotation direction to the maximum extent permitted by slots 87 and 88 and sections 59', 84 and 58' will be successively engaged, thereby advancing the time of opening of the exhaust valve 42 by 45° of crank-shaft movement without affecting the time of closing thereof, the resultant exhaust valve timing being indicated in Fig. 4.

One of the intermediate speed timings obtainable is indicated in Fig. 4. The intermediate or floating section 84 may be omitted if desired without affecting the resultant valve timing but obviously the valve action will be smoother when said section is incorporated. It will also be obvious that if the intake and exhaust valves are each provided with a tappet, like tappet 51', but rotatively positioned 180° apart, one in respect to the other, the timing of the intake and exhaust valves will be as indicated in Figs. 3, 4 and 5.

*Description of Figs. 22 to 40, inclusive*

The engine illustrated in Figs. 22 and 22a is like the engine of Figs. 1 and 2 except for slight modifications made for the purpose of accommodating the modified form of the valve actuated timing mechanism of Figs. 22 to 40 inclusive. Of the conventional parts of this engine herein illustrated, the engine block is indicated as an entirety by the numeral 100. This block is formed with the usual cylindrical bore 101 and about the cylinder 101 with water jackets 102. The upper portion of the crank case of the engine, and which is formed integrally with the cylinder block, is indicated by 103. This crank case forming portion of the block is formed to enclose the variable timing valve actuating mechanism. The upper end of the cylinder 101 is closed by a water jacketed cylinder head 104 that is formed to afford a combustion chamber 105, and which is provided with the usual spark plug 106. Formed in the engine block 100 for communication with the cylinder 101 are intake and exhaust ports 107 and 108 respectively. The poppet valves controlling these ports are indicated by 109 and 110 respectively. The axial stems 111 of these valves work slidably through valve guides 112. These valves are maintained under yielding tension to close against their seats 113 by means of the usual coil compression springs 114. The valve springs and associated mechanism are contained within a valve mechanism compartment 115 above the crank case and laterally off-set from the cylinder, and which compartment is normally closed by a removable cover plate 116. The cam shaft of Figs. 22 and 22a is indicated by numeral 117. This cam shaft may be assumed to be journaled within the crank case in the conventional manner and to be driven in the conventional manner from the engine's crank case, not shown.

The cam shaft 117 is provided with intake and exhaust valve operating cams individually indicated as entireties by numerals 118 and 119 respectively. These cams, which are peculiar in character, operate the intake and exhaust valves 109 and 110 respectively through the medium of the novel tappet mechanisms 120 and 121. The cams 118 and 119 are alike but are reversibly applied side for side on the cam shaft and each comprises main and supplemental sections 122 and 123 respectively that are laterally and circumferentially off-set one in respect to the other. These main and supplemental cam sections 122 and 123 are integrally formed and are of equal radius, the sections 123 being in the nature of lugs projecting from the laterally intermediate portions of the main cam sections and being flanked on opposite sides by the main cam sections.

The supplemental lifting surfaces of the cam sections 123 have the same contour as the lifting surfaces of the main cam sections 122, but are circumferentially spaced with respect to the corresponding surfaces of the main body sections. In accordance with the example of variable timing hereinafter given, the lifting surfaces of the supplemental cam sections are circumferentially spaced 10° from the corresponding lifting surfaces of the main cam sections. This is clearly illustrated in Fig. 36 wherein it is also shown that the intake and exhaust valve operating cams 118 and 119 respectively are alike but reversibly applied on the cam shaft 117.

Figure 36:
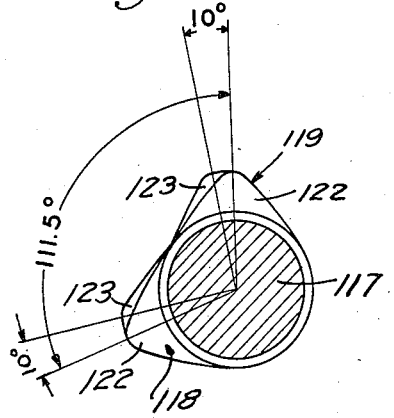
Fig. 36 is a sectional view through the crank shaft to the engine of Fig. 22 and partially illustrating the lay-out of the intake and exhaust cams and the relative positions of the intake and exhaust valve operating cams on the crank shaft for the purpose of obtaining the particular valve timing herein disclosed.

By reference to Fig. 36 it will be also seen that the main section of the exhaust valve operating cam 119 is rotatively advanced on the cam shaft 111.5° with respect to the main section of the intake valve operating cam 118 in the direction of rotation of the crank shaft which is clockwise in respect to the drawings, such spacing being, of course, recited solely for the purpose of obtaining the particular variable valve timing range herein recited for the purpose of illustrating a preferred embodiment of this form of the invention. Obviously from the drawings, it will be seen that the adjoining lifting surfaces of the main and supplemental cam sections are tangential.

The tappet structures 120 and 121, which constitute the connecting links between the cams 118 and 119 respectively and the stems 11 of the intake and exhaust valves 109 and 110 respectively, each include a stem-like valve engaging main body 124 that is rigidly formed at its lower end with a supplemental cam section engaging head 125, and at its upper end is provided with valve clearance adjusting nuts 126. The tappet stem-like body 124 is slidably mounted in and guided for true straight line reciprocating movements by a bearing sleeve 127, the axis of which is preferably and is herein illustrated as being radial of the cam axis (see particularly Fig. 35). In accordance with the present illustration the bearing sleeves 127 are provided with mounted flanges 128, through the medium of which and bolts or the like 129, the bearing sleeves are detachably anchored to the engine block casting. The rigid heads 125 of the tappet stems are formed to afford relatively obliquely disposed supplemental cam section engaging surfaces 130 and 131. In the forms of the invention illustrated, the cam engaging surfaces 130 and 131 are straight and are disposed at obtuse angles, one in respect to the other, and the junction of these surfaces describe or have as their locuses, straight lines that extend uni-directionally with respect to straight lines radial of the axis of their respective cams.

Figure 35:
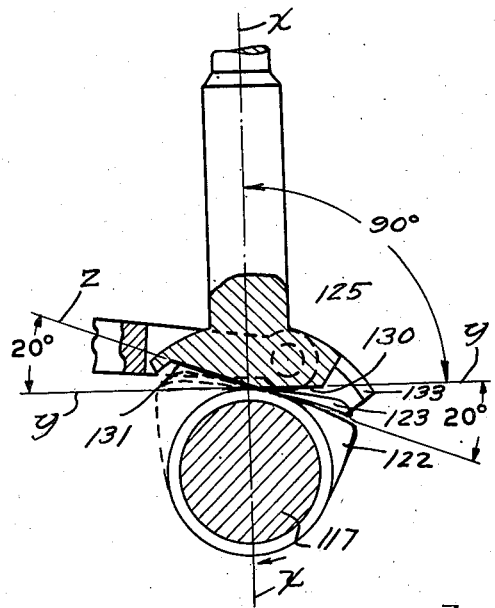
Fig. 35 is a detail lay-out view of one of the adjustable tappet mechanisms of Figs. 22 to 34, with some parts shown in elevation and some parts in axial section.
Figure 37:
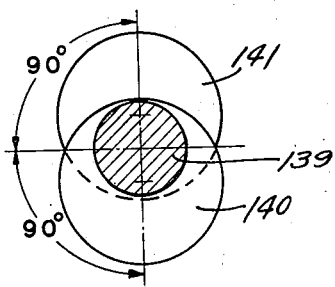
Fig. 37 is a sectional view through the variable timing mechanism control shaft and illustrates the relative positions thereon of the operating eccentrics of the intake and exhaust valve mechanisms.

In accordance with the instant example, the surfaces 130 are disposed at a 90° angle with respect to the line $x$ (see line $y$ Fig. 35), and the surfaces 131 are disposed at a 20° angle with respect to their co-operating surfaces 130 (see line $z$ in Fig. 35).

The tappet heads 125 being rigidly mounted on or formed with the straight line guide reciprocating tappet stems 124 constitute the non-shiftable cam engaging elements of the tappets, and are integrally formed with arcuate flanges 132 that project laterally beyond opposite sides of the tappet heads 125. Slidably engaging opposite edges of the flanges 132 are shiftable cam engaging elements 133 that are in the nature of laterally spaced pairs of shoes. The edges of the flanges 132 are bevelled and the cam engaging shoes 133 are provided with undercut cross sectionally bevelled slots 134 that receive and slidably interlock with the bevelled edges of the arcuate flanges 132. These co-operating pairs of cam engaging shoes 133 are maintained in transversely aligned relation on opposite edges of the flanges 132 by means of operating yokes 135, which are provided at their ends with axially aligned pivot pins 136 that work in bearing apertures formed in hubs 137 of the shiftable cam engaging shoes. The bifurcated ends of the yokes 135 are preferably normally spaced apart a distance slightly less than the distance between the faces of the hubs 137 of opposite co-operating shoes 133 so that they will maintain opposite shoes 137 of each pair snugly interlocked with the bevelled edges of the flanges 132. The shoes 133 have parallel cam engaging surfaces that are adapted to co-act with the lifting surfaces of the main cam sections, it being understood that the opposed faces of the shoes of each pair work closely against the opposite sides of the rigid cam heads 125 and are spaced apart sufficiently that they will freely receive the supplemental cam sections 123.

The main cam section engaging surfaces 138 of the shoes 133 are flat and straight from end to end and in length are approximately equal to the combined length of the oblique cam engaging surfaces 130 and 131, and are so proportioned that they will come flush with either of the surfaces 130 or 131 with which they are pivoted into alignment. Preferably in accordance with the instant illustration, the axis of the arcuate guide flanges 132 and their co-operating shoe grooves are co-incidental with the cam axis when the parts are positioned as shown for example in Figs. 23 and 25. Hence, in the preferred arrangement illustrated, not only have the arcuate guide surfaces 132 of the rigid tappet head 125 a radii equal to the distance therebetween and the axis of the cam shaft when the shiftable cam engaging elements are riding on the heel of the cam, but it will be further evident that the locus of the axis of these guide surfaces will travel in a straight line radial of the cam axis.

For operatively adjustably positioning and maintaining the desired relative positions of the shoes 133 of the intake and exhaust valve operating tappet mechanisms, there is provided, in addition to the yokes 135, a control shaft 139 carrying eccentrics 140 for the intake valve mechanism and 141 for the exhaust valve mechanism and lever acting yokes 142. The control shaft 139 may be assumed to be suitably journaled in the crank case structure and to work through one end thereof. Provided outward of the crank case the control 139 is equipped with an operating or control lever 143 that carries a pointer 144 for co-operation with the calibrated segmental dial 145. The control shaft 139, the eccentrics 140 and 141 and yokes 135 an 142 are made readily accessible by providing the side of the crank case with a removable section 146. The yokes 142 closely embrace the eccentrics 140 and 141 and are each pivotally mounted on a stationary shaft 147, which shaft may be assumed to be rigidly supported from the crank case. The single ends of the yokes 135 are pivotally anchored in bifurcated portions of the eccentric engaging yokes 142 by means of pins 148. In accordance with the preferred illustration, the axis of the shaft 147 is approximately in the same horizontal plane as that of the cam shaft, and the radii of the pivot pins 148 are approximately equal to the radii of the shoe engaging pivot pins 136.

The tappet mechanism for the intake and exhaust valves are structurally alike and are rotatively positioned alike on the axis of their respective stems 124, and also the yokes 135 and 142 are substantially alike for both the intake and exhaust valves, but the eccentrics 140 and 141 are positioned on the control 180° apart on the control shaft so that when the cam engaging surface 138 of the shoes 133 of the intake valve mechanism are aligned with the surface 130 of the intake valve tappet head, the cam engaging surfaces of the shoes of the exhaust valve mechanism will be aligned with the cam engaging surface 131 of the exhaust valve tappet head and reversely, it being understood that these represent the extremes of adjustment. Of course, the shoes of the exhaust valve and intake valve operating tappets will be positioned substantially alike when the control shaft 139 is rotatively positioned half-way between its two extreme positions. The relative positions of the eccentrics 140 and 141 is diagrammatically illustrated in Fig. 37.

In Figs. 22 to 40 the only means illustrated for operating the control shaft 139 is the lever 143 which may be assumed to be subject to manual control. However, it should be understood that the control shaft may, if desired, be automatically controlled in proper relation to variations in engine speed, and this may be accomplished by means of the governor mechanism of Figs. 6, 7 and 8.

Figure 38:
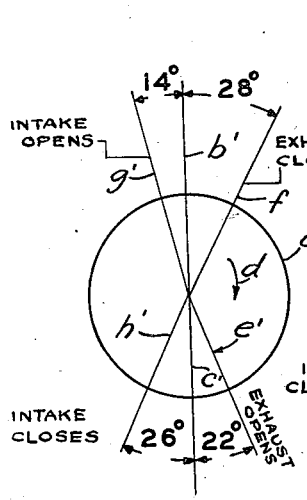
Figs. 38, 39 and 40 are valve timing diagrams illustrating several different valve timings obtainable by means of the mechanism disclosed in Figs. 22 to 37, inclusive.
Figure 39:
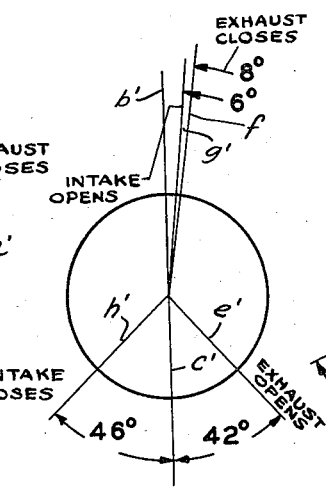
Figure 40:
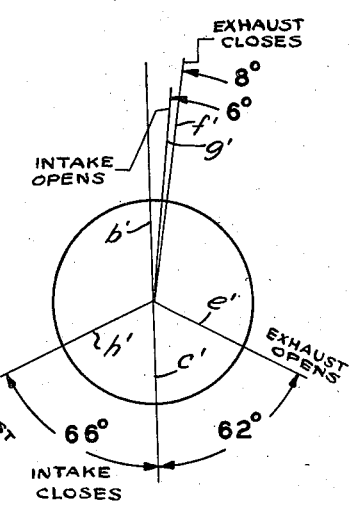

Certain of the valve timings obtainable with the described embodiment of the form of the invention illustrated in Figs. 22 to 40 inclusive are indicated diagrammatically in Figs. 38, 39 and 40. In these figures the circles marked $a'$ indicate one complete revolution or 360° of movement of the engine's crank shaft; the vertical lines marked $b'$ indicate the top dead-center position of the engine's piston operating crank; vertical lines marked $c'$ indicate bottom dead-center position of the engine's piston operating crank; arrows $d'$ indicate the direction of rotation of the crank shaft; lines $e'$ indicate the times of opening of the exhaust valve with respect to crank shaft position under different degrees of valve timing adjustment; lines $f'$ indicate the times of closing of the intake valves with respect to crank shaft position under different degrees of valve timing adjustment; lines $g'$ indicate the times of opening of the intake valve with respect to crank shaft position under different degrees of valve timing adjustment, and lines $h'$ indicate the times of closing of the intake valve under different degrees of valve timing adjustment.

Operation

For low speed engine operation, the control shaft 139 will be rotatively positioned as indicated in Figs. 22, 22a, 23 and 24 in which position the indicator or pointer 144 of operating lever 143 will be positioned opposite the dial calibration marked low speed (see Fig. 22). With the control shaft thus positioned, the shiftable cam engaging elements or shoes 133 of the intake valve operating tappets 120 will be positioned as indicated in Figs. 22 and 23, and the shiftable cam engaging elements or shoes of the exhaust valve operating tappets 121 will be positioned as indicated in Figs. 22a and 25.

For this position of the parts for low speed engine operation, the timing of the intake and exhaust valves with respect to crank shaft position will be as indicated in Fig. 38. By reference to Figs. 22 and 23 (particularly Fig. 22) it will be seen that when the parts are thus positioned to obtain the low speed valve timing indicated in Fig. 38, the cam engaging surfaces of the shoes 133 of the intake valve mechanism are aligned with the cam engaging surface 130 of the rigid head of the tappet 120 so that the intake valve tappet 120 will be both lifted to valve open position and dropped to valve closed position by co-operation with the lifting surfaces of the main section of cam 122. When the parts are thus positioned, the intake valve will be opened by engagement of the leading surfaces of the main section of the intake valve operating cam 118 with the horizontally disposed cam engaging surfaces of the co-operating tappet shoes 133, and will be closed under engagement of the trailing surfaces of the cam 118 with the surfaces 138 of the co-operating shoes 133. The supplemental cam section 123 of cam 118 is entirely inoperative when the parts are adjusted for low speed operation (see dotted cam position in Fig. 23) due to the fact that the said supplemental cam section leads the main cam section by only 10°; whereas, in Fig. 23, for example, the co-acting surface therefor of the head of cam 118 is 20° oblique at this time to the cam engaging surfaces of the intake tappet shoes 133, which means that under these conditions the supplemental cam section 123 of the intake valve mechanism will clear its co-acting surface 131 by a full 10°.

Figure 25:
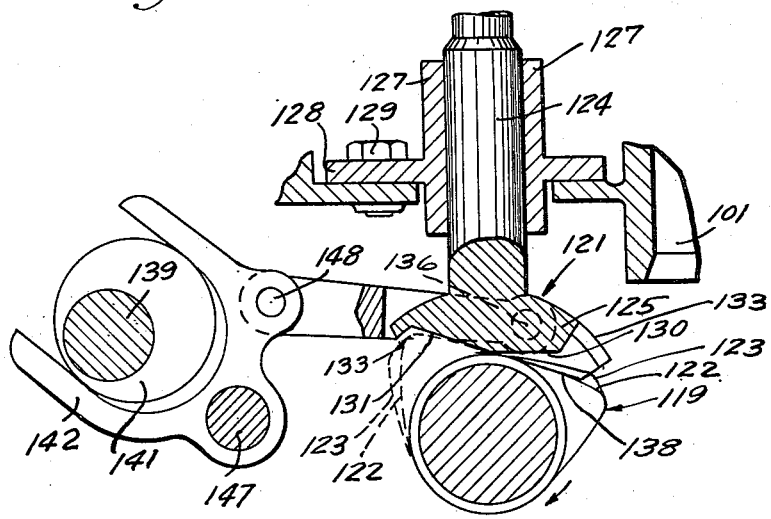
Figs. 25 and 26 are views similar to Figs. 23 and 24 but illustrating the exhaust valve operating mechanism of the engine of Fig. 22, and which may be assumed to be directly behind the intake valve mechanism of Fig. 22.

By reference now to Fig. 25, it will be seen that with the parts positioned for low speed operation, the tappet shoes of the exhaust valve operating mechanism are advanced to a position wherein their cam engaging surfaces are aligned with the cam engaging surface 131 of the exhaust valve tappet 121.

In Fig. 25 the cam is shown by dotted lines at the left in a position ready to impart initial valve opening movements to the tappet 121, and the cam is illustrated by full lines at the right in the position of final exhaust valve closing.

By examination of Figs. 5, it will be evident that for extreme lower speed operation the valve operating tappet 121 will be lifted to valve open position by engagement of the main tappet section 122 with the co-acting oblique surface 131, and will be lowered to valve closed position by engagement of the main cam section with the projected cam engaging surfaces 138 of the co-operating shiftable shoes 133. During the closing movement of the exhaust valve, the supplemental cam section will be entirely inoperative due to the fact that the said surfaces 138 are now disposed at a 20° angle with respect to the non-adjustable surface 130, while the supplemental cam section is only 10° rotatively off-set from the main cam section. As before indicated, with the parts positioned as described for extreme low speed operation, the timing of the intake and exhaust valves with respect to the cycle of the crank shaft will be as indicated in Fig. 38, and the supplemental cam sections will be entirely ineffective.

Figure 26:
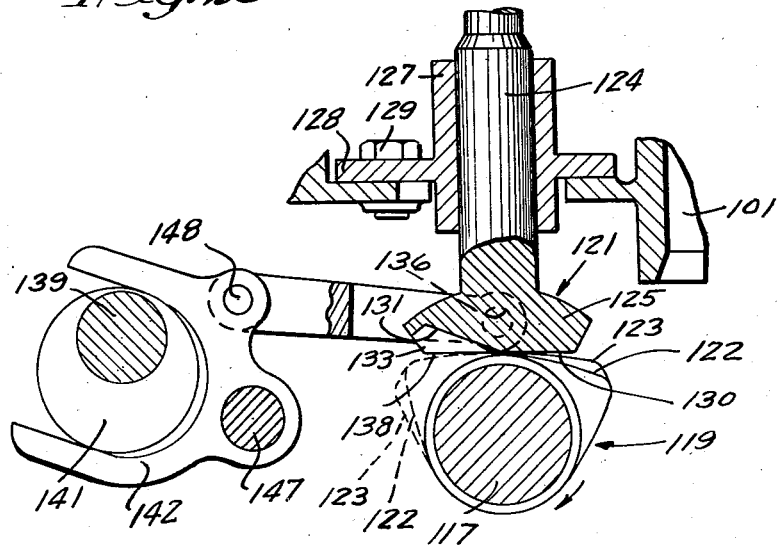

For extreme high speed operation, the control shaft 139 is rotated through the medium of the operating lever 143 in a clockwise direction in respect to the drawings until the pointer 144 is opposite the graduation on dial 145 marked high speed, at which time the several adjustable parts of the exhaust valve operating tappets 121 and the control mechanism therefore will be positioned as illustrated best in Figs. 22a, 24 and 26 and the resultant times of opening and closing of the intake and exhaust valves with respect to crank shaft positions be as best shown in the diagrammatic view of Fig. 40.

By reference particularly to Figs. 24 and 26, it will be seen that for extreme high speed operation the shoes 133 of the intake valve mechanism are now extended to a position wherein they are in alignment with the oblique surfaces 131; whereas, the shoes 133 of the exhaust valve mechanism are fully retracted to positions of alignment with the surface 130 of the exhaust valve operating cam. With the parts thus positioned, the intake valve operating tappet 120 will be raised to valve open position by engagement of the supplemental cam section 123 of cam 119 with the oblique surface 131 of tappet 120, and said tappet 120 will be lowered to valve closed position under engagement of the trailing surface of the main cam section 122 with the projected surfaces 138 of shoes 133, which latter are now aligned with the oblique surface 131. Now by comparing Figs. 23 and 24, it will be evident that for high speed operation, the opening of the intake valve has been delayed 10° of cam shaft movement; whereas the time of closing of the intake valve has been delayed a full 20° of cam shaft movement. In other words, for high speed, the open period of the intake valve has been shifted or increased by 10° of cam movement in addition to having been bodily retarded with respect to the crank shaft.

By comparing Figs. 38 and 40, it will be seen that between the low speed and high speed timing adjustments, the opening of the intake has been delayed a total of 20° of crank shaft movement, and the time of closing thereof has been retarded a total of 40° of crank shaft movement, so that the actual increase in the valve opening period with respect to crank shaft movement from low speed to high speed adjustments is 20°.

By reference now particularly to Fig. 26, it will be noted by the dotted position of the cam at the left and by the full line position of the cam shown at the right, that the exhaust valve tappet 121 is opened by engagement of the now horizontally disposed surfaces 138 of the shoes 133 with the leading edge of the main cam section 122, and are lowered to valve closed position by engagement of the non-adjustable surface 130 with the supplemental cam section 123 of cam 119.

Now by comparing Figs. 25 and 26, it will be seen that from the low speed position of the tappet parts shown in Fig. 25 to the high speed position of the exhaust valve tappet parts shown in Fig. 26, the time of opening of the exhaust valve has been advanced a full 20° of cam shaft movement; whereas, the time of closing of the exhaust valve has been advanced 10° of cam shaft movement.

By comparing Figs. 38 and 40, it will be seen that this valve timing variation translated into degrees of crank shaft movement represents from low speed timing to high speed timing an advance of 40° of crank shaft movement in the opening of the exhaust valve and an advance of 20° in the time of closing in the exhaust valve, the total valve open period now being 20° more of crank shaft movement at high speed than was the case of low speed.

From the drawings, it will be evident that in the arrangement as illustrated in Figs. 22 to 40 inclusive, the time of opening of the exhaust valves and the time of closing of the intake valves are shifted between two extremes of adjustment much more than the times of closing of the exhaust valve and opening of the intake valve. It will also be apparent from an examination of the structures that the relative amount of shifting of the time of opening of the intake valves and closing of the exhaust valves with respect to the times of closing of the intake valves and opening of the exhaust valves, is controlled largely by the amount of angular off-set of the supplemental cam section with respect to their integrally formed main cam sections; and may be increased or decreased to a considerable extent by making variations in the angles of the supplemental cam section without effecting the times of closing of the intake valves and the time of opening of the exhaust valves.

An intermediate valve timing obtainable with the arrangement described in connection with Figs. 22 to 40 inclusive is shown in Fig. 39. This intermediate valve timing is representative of the valve timing employed in certain standard automotive engines and, is in fact, representative of the valve timing found in 1938 Dodge automobiles. The form of the invention disclosed in Figs. 22 to 40 inclusive, has been built into a 1938 Dodge automobile engine wherein it has under-gone severe tests and shown a high degree of increased efficiency at both high speed and low speed ranges over the same type of engine incorporating the conventional fixed timing valve operating mechanism.

The intermediate standard timing indicated in Fig. 39 is brought about by setting the control shaft half-way between the extreme positions, or in other words, in a position wherein the pointer 144 (see Fig. 2) is in alignment with the word "Standard" on the dial 145. With the control shaft thus positioned, the shiftable cam engaging elements or shoes of the intake and exhaust valve operating mechanisms will be positioned alike with their cam engaging surfaces 138 disposed at a 10° angle with respect to their co-operating surfaces 130, and also at a 10° angle with respect to their co-operating surfaces 131. It is at this midway adjusted position of the tappet shoes that the opening of the intake valves and the closing of the exhaust valves is transferred from the main cam sections to the supplemental cam sections. Hence, the entire amount of shifting of the time of opening of the intake valve and the time of closing of the exhaust valve between extreme low speed and high speed valve timing adjustments is brought about during the first half of the adjusting range from low speed toward high speed during the time the intake valve is opened and the exhaust valve is closed by engagement of the main cam section with the surfaces 138 of the shoes 133, but after the supplement cam sections come into operative engagement with the non-shiftable oblique surfaces 131 at this intermediate point, further adjustment of the shoes 133 in the direction of high speed timing has no effect upon the time of opening of the intake valve or the time of closing of the exhaust valve, but continues to be effective in varying the time of closing of the intake valve and the time of opening of the exhaust valve.

Description of Fig. 12

In describing the preferred embodiment of the several forms of the invention previously described, it has thus far been assumed that the arcuate guides for the shiftable tappet elements, which arcuate guides are rigid with the straight line guiding tappet bodies, have their axes co-axial with the cam shaft when the tappet engaging elements are riding upon the heel of their cam in their lowered valve closed positions so that the locus of the axis of the arcuate guide surfaces will be a straight line radial of the cam axis. While this is considered the preferred practice in most instances, it is the purpose of the present example to illustrate how, particularly in certain forms of the invention, this practice can be varied slightly to advantage.

Figure 21:
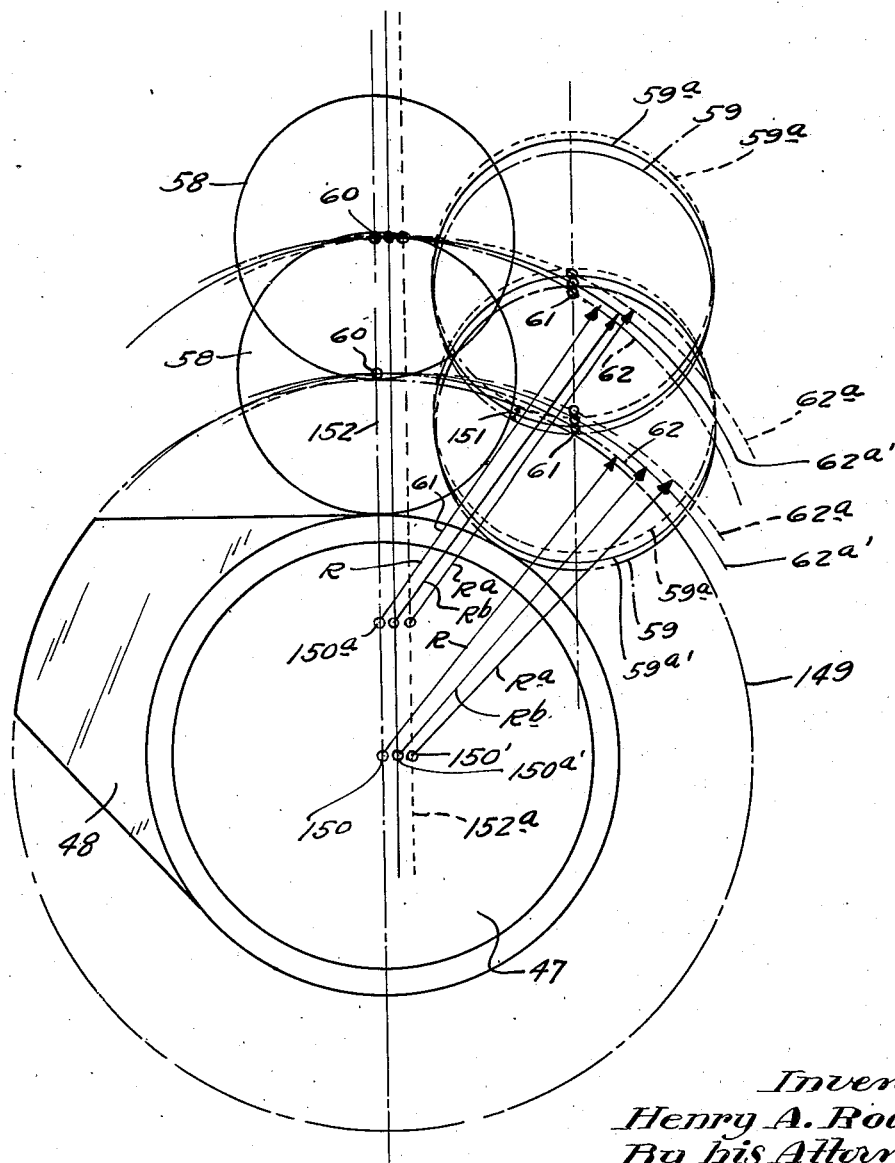
Fig. 21 is a diagrammatic view illustrating certain slight variations in application, particularly of the form of the invention illustrated in Figs. 1 to 11 inclusive and 20.

The example given in Fig. 21 is based upon the structure of Figs. 1 to 22, and 20. With reference to the diagrammatic view of Fig. 21, the cam shaft of Figs. 1 to 11 inclusive, is diagrammatically indicated and identified by 47 as in Figs. 1 to 11. One of the cams, as in Figs. 1 to 11, is indicated by 48, the non-shiftable tappet engaging roller is indicated by 58 and the shiftable cam engaging roller is indicated by 59. Also in Fig. 21 the arcuate guide slot for the shiftable roller 59 is diagrammatically indicated by broken arcuate lines 62. Rollers 58 and 59 are illustrated only in their extreme relative shifted positions.

The circle traversed by the toe end of the cam 48 is indicated by broken line circle 149 of Fig. 21. The axis point of the roller 58 is indicated by 60, and the axis point of the roller 59 is indicated by 61. In accordance with Figs. 1 to 11, the axis of the arcuate guide 62 is co-incidental with the axis of the cam shaft when the rollers are in their lowered positions indicated in Fig. 21. This lower co-incidental axis point is indicated by 150 in Fig. 21. Of course, this axis point moves in a straight line when the rollers are moved from their lower positions of Fig. 21 to their upper positions of Fig. 21, and this raised axis point of the arcuate guide 62 is indicated by 150a. The lower and upper arrows identified by R indicates the radius of the arcuate guide 62 in both its lower and upper positions. It will be noted by examining Fig. 21 that the lower arcuate guide line 62 is concentric with the cam shaft and the arcuate broken line 149, but that the upper arcuate guide line 62 is considerably eccentric to the cam shaft, this being, of course, due to the fact that the radius R of the arc 62 has been shifted upwardly; whereas theoretical perfection could only be obtained by increasing the radius of the arc in an amount equal to the shift. This shifting of the arc produces a very slight error in valve lift between high speed and low speed timing adjustment of the roller 59, as will be apparent from Fig. 21 wherein it will be noted that the rollers 58 and 59 indicated by full and broken lines, respectively, are both seated on the heel of the cam in their lowered positions; whereas in their upper positions, the broken line roller 59 drops considerably below the arc 149, which means that, under rotation of the cam, there will be an error in valve lift under this extreme adjustment equal to the distance between broken line roller 59 and broken line 149 at point 151. The locus of the axis of the arcuate guide 62 is indicated by vertical broken line 152, which is a straight line radial of the cam axis.

Now if it is deemed desirable to substantially fully correct the above noted error in valve lift under extreme high speed timing adjustment, this can be done quite successfully by shifting the axis of the arcuate guide 62 from point 150 to point 150'. When this is done, arcuate guide 61 will be as indicated by lower and upper dotted line arcs 62a, which line intersects the axis point 60 of roller 58. The radii of these broken line arcs 62a are indicated by Ra. With the roller 59 now shifted to its extreme position on the arc 62a, it will assume upper and lower positions indicated by dotted circles 59a.

By reference to Fig. 21, it will be seen that this dotted circle 59a, in its upper position, is tangential with the broken line arc 149 just as is upper position roller 58, so that there will be no difference in valve lift between the two extremes of adjustment of the shiftable roller. However, by reference to the lower dotted circle 59a of Fig. 21, it will be noted that in its lower extreme shifted position, the roller will now be considerably spaced from the heel of the cam. The locus of the axis of the dotted line arcuate guide surface 62a is indicated by 152a. Obviously with the arrangement last described, the locus of the axis of the arcuate guide surface 62a is a straight line parallel to but spaced from a line radial of the cam axis. This shifting of the axis point of the arcuate guide surface from point 150 to 150' represents quite an extreme shift, and if such shifting is to be done it is believed better to compromise the extent of shift to a point about half-way between points 150 and 150' as is indicated by point 150a'. When this is done the arcuate guide surfaces will assume upper and lower positions as indicated by full lines 62a'', the radius of the arcs 62a' will be as indicated by arrows Rb. The roller 59 in its extreme shifted condition will assume upper and lower positions as indicated by full line circle 59a''.

With this compromise arrangement, the shiftable roller 59a' (see full line circles) will produce an error in valve lifting approximately half as great as when the axis of the arcuate guide is at point 150, and in its lower position, the roller 59 (see circle 59a') will be spaced only about one-half as far from the heel of the cam as when the axis of the arcuate guide was shifted to the extreme position of point 150'. Of course, it will be understood that Fig. 21 is not only many times enlarged, but is, in fact, distorted in order to emphasize the actual errors encountered. This exaggeration being done for the purpose of making the illustration clear.

In all forms of the invention described, the following statements may be properly made with respect to the arcuate guide surfaces for the shiftable cam engaging elements. (a) The axis of each of the shiftable cam engaging elements describes under reciprocation or has as the locus of its axis a straight line that is uni-directional with respect to a straight line radial of the cam axis. (b) The divergence of each arcuate guide surface in respect to any straight line will be constant since in all forms the guide surfaces are positively held against tipping action during reciprocation. (c) Angular disposition of a straight line drawn between any two spaced points about any one of the arcuate guide surfaces will be constant with respect to any other straight line since in all forms of the invention the guide surfaces are positively held against tilting or tipping movements.

This application is a continuation in part of my co-pending application S. N. 753,357, filed November 16, 1934, under title "Internal combustion engine."

What I claim is:

1. In an engine, a valve, a valve-actuating cam and valve actuating connections between the valve and cam, said valve actuating connections comprising a reciprocating member guided for straight line reciprocating movements and rigidly carrying a non-adjustable cam-engaging portion having a relatively flat cam engaging surface, arcuate guide means also rigidly carried by said straight line guided member, an adjustable cam engaging element having a relatively flat cam-engaging surface, guide means on said adjustable element in sliding engagement with said arcuate guide means, and means for adjustably shifting said element about said arcuate guide surface, the axis of said arcuate guide surface being on and moving in a straight line radial of the cam axis, said cam being formed with a relatively sharp nose providing a reduced area for contact with said relatively flat cam engaging surface whereby the period of time during which said valve may be held open is materially reduced when said cam engaging elements are in axial alignment.

2. In an engine, a valve, a valve actuating cam having main and supplemental lifting surfaces that are laterally and circumferentially offset, and valve actuating connections between the cam and valve including the reciprocating tappet body, means guiding the tappet body for true straight line reciprocating movements, a cam engaging head rigidly carried by the straight line guided tappet body and having relatively flat oblique cam engaging surfaces, and an adjustably shiftable cam engaging element carried by the rigid head of the straight line guided body through means including an arcuate guide surface that is rigid with respect to the straight line guided tappet body, said shiftable cam engaging element having a cam engaging surface that is laterally offset from the cam engaging surfaces of the straight line guided tappet body, said cam being formed with a relatively sharp nose providing a reduced area for contact with said relatively flat cam engaging surface whereby the period of time during which said valve may be held open is materially reduced when said cam engaging elements are in axial alignment.

3. The structure defined in claim 2 in further combination with means for adjustably shifting the said adjustable cam engaging element on the said arcuate guide surface and maintaining the same in desired adjusted position.

4. In an engine, a valve, a valve actuating cam, and variable valve timing actuating connections between the cam and valve, said cam being provided with laterally and circumferentially offset tappet engaging surfaces, said valve actuating connection comprising a reciprocating tappet body, means guiding the reciprocating tappet body for true straight line reciprocating movements, said straight line guided tappet body being provided adjacent the cam with adjoining oblique relatively flat cam engaging surfaces that are aligned with only one of the laterally spaced cam surfaces, arcuate guide means rigidly carried by the straight line guided tappet body for and only for straight line reciprocating movements therewith, and a cam engaging shoe slidably carried by the said arcuate guide means and having a straight cam engaging surface laterally spaced from the cam engaging surfaces of the straight line guided tappet body and being adapted to engage the other of the laterally offset cam surfaces, said cam being formed with a relatively sharp nose providing a reduced area for contact with said relatively flat cam engaging surface whereby the period of time during which said valve may be held open is materially reduced when said cam engaging elements are in axial alignment.

5. In an engine, a valve, a valve-actuating cam and valve actuating connections between the valve and cam, said valve actuating connections comprising a reciprocating member guided for straight-line reciprocating movements and rigidly carrying a non-adjustable cam-engaging portion having a relatively flat cam engaging surface, arcuate guide means also rigidly carried by said straight line guided member, an adjustable cam engaging element having a relatively flat cam-engaging surface, guide means on said adjustable element in sliding engagement with said arcuate guide means, and means for adjustably shifting said element about said arcuate guide surface, the axis of said arcuate guide surface being on and moving in a straight line that is uni-directional with respect to a straight line radial of the cam axis, said cam being formed with a relatively sharp nose providing a reduced area for contact with said relatively flat cam engaging surface whereby the period of time during which said valve may be held open is materially reduced when said cam engaging elements are in axial alignment.

6. In an engine, a valve, a valve actuating cam having main and supplemental lifting surfaces that are laterally and circumferentially offset, and valve actuating connections between the cam and valve which include a reciprocating tappet body, means guiding the tappet body for true straight line reciprocating movements, a cam engaging head rigidly carried by the straight line guided tappet body and having relatively flat cam engaging surfaces that lie in the plane of movement of the supplemental lifting surface of the cam and are obliquely disposed one in respect to the other, and an adjustably shiftable cam engaging element carried by the rigid head of the straight line guided tappet body through means including an arcuate guide surface that is rigid with respect to the straight line guided tappet body, said shiftable cam engaging element having a cam engaging surface for co-operation with the main cam section and being laterally offset with respect to the supplemental cam section, said cam being formed with a relatively sharp nose providing a reduced area for contact with said relatively flat cam engaging surface whereby the period of time during which said valve may be held open is materially reduced when said cam engaging elements are in axial alignment.

7. In an engine, a valve, a valve actuating cam and valve actuating connections between the valve and cam; said valve actuating connections comprising a reciprocable tappet body, means guiding said reciprocable tappet body for straight line reciprocating movements, said reciprocable tappet body being provided with a rigid cam engaging head, and arcuate guide flanges projecting laterally outwardly of said head, a laterally spaced pair of cam engaging shoes each having an arcuate slot receiving an opposite edge of said arcuate flange, whereby the shoes will be guided for arcuate adjusting movements on said arcuate flange, and means for maintaining said shoes in lateral alignment and yielding pressed laterally inwardly against said arcuate flange.

8. The structure defined in claim 7 in which the arcuate edges of said flanges and co-operating slots of said shoes are cross sectionally bevelled.

9. The structure defined in claim 7 in which the said means is in the nature of a yoke pivotally anchored to opposite shoes and maintaining the shoes under yielding compression to maintain tight frictional engagement between the shoes and flanges.

10. The structure defined in claim 7 in which the said means is in the nature of a yoke pivotally anchored to opposite shoes and maintaining the shoes under yielding compression to maintain tight frictional engagement between the shoes and flanges, and in which the arcuate edges of the flanges and the cooperating slots of the shoes are bevelled.

11. The structure defined in claim 6 in which the said arcuate guide surface has as the locus of its axis a straight line radial of the cam axis.

12. The structure defined in claim 7 in which the said arcuate guide flanges each has as the locus of its axis a straight line radial of the cam axis.

13. The structure defined in claim 7 in which the arcuate edges of said flanges and the co-operating slots of the shoes are cross-sectionally beveled, each of said flanges and slots having as the locus of its axis a straight line radial of the cam axis.

14. The structure defined in claim 7 in which the said means is in the nature of a yoke pivotally anchored to opposite shoes and maintaining the shoes under yielding compression to maintain tight frictional engagement between the shoes and flanges, said arcuate guide flanges each having as the locus of its axis a straight line radial of the cam axis.

15. The structure defined in claim 1 in which the said means is in the nature of a yoke pivotally anchored to opposite shoes and maintaining the shoes under yielding compression to maintain tight frictional engagement between the shoes and flanges, and in which the arcuate edges of the flanges and the co-operating slots of the shoes are bevelled, said arcuate guide flanges each having as the locus of its axis a straight line radial of the cam axis.

16. The structure defined in claim 2 in which the said arcuate guide surface has as the locus of its axis a straight line radial of the cam axis.

17. The structure defined in claim 2 in further combination with means for adjustably shifting the said adjustable cam engaging element on the said arcuate guide surface and maintaining the same in desired adjusted position, and in which the said arcuate guide surface has as the locus of its axis a straight line radial of the cam axis.

18. The structure defined in claim 4 in which the said arcuate guide means has as the locus of its axis a straight line radial of the cam axis.

19. In an engine, a valve actuating cam and valve actuating connections between the valve and cam, said valve actuating connections comprising a straight line guided reciprocable tappet body having a rigid cam-engaging head, a laterally spaced pair of relatively flat cam-engaging shoes disposed on opposite sides of said rigid head, and arcuate guide means anchoring the shoes to the rigid tappet head for straight line movements therewith and for arcuate adjustments with respect thereto, said cam being formed with a relatively sharp nose providing a reduced area for contact with said relatively flat cam engaging surface whereby the period of time during which said valve may be held open is materially reduced when said cam engaging elements are in axial alignment.

20. In an engine, a valve actuating cam and valve actuating connections between the valve and cam, said valve actuating connections comprising a straight line guided reciprocable tappet body having a rigid cam-engaging head, a laterally spaced pair of cam-engaging shoes disposed on opposite sides of said rigid head, and arcuate guide means anchoring the shoes to the rigid tappet head for straight line movements therewith and for arcuate adjustments with respect thereto, and means for maintaining said shoes in lateral alignment and yieldingly pressed laterally inwardly against the said rigid head.

21. In an engine, a valve actuating cam and valve actuating connections between the valve and cam, said valve actuating connections comprising a straight line guided reciprocable tappet body having a rigid cam-engaging head, a laterally spaced pair of cam-engaging shoes disposed on opposite sides of said rigid head, and anchored thereto by arcuate flange and groove connections, whereby the shoes will be guided for arcuate adjusting movements in respect to the rigid head.

22. In an engine, a valve actuating cam and valve actuating connections between the valve and cam, said valve actuating connections comprising a straight line guided reciprocable tappet body having a rigid cam-engaging head, a laterally spaced pair of cam-engaging shoes disposed on opposite sides of said rigid head and anchored thereto by arcuate flange and groove connections, whereby the shoes will be guided for arcuate adjusting movements in respect to the rigid head, and means for maintaining said shoes in lateral alignment and yieldingly pressed laterally inwardly toward said head.

HENRY A. ROAN.